(12) United States Patent
Lu

(10) Patent No.: US 7,254,701 B2
(45) Date of Patent: Aug. 7, 2007

(54) METHOD AND DEVICE FOR SAFEGUARDING A DIGITAL PROCESS DEVICE

(75) Inventor: Victor Lu, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 657 days.

(21) Appl. No.: 10/097,743

(22) Filed: Mar. 15, 2002

(65) Prior Publication Data

US 2003/0051125 A1    Mar. 13, 2003

(30) Foreign Application Priority Data

Sep. 12, 2001    (TW) ............................... 90122530 A

(51) Int. Cl.
  *G06F 9/00*   (2006.01)
  *G06F 15/177*   (2006.01)
(52) U.S. Cl. .............................................. 713/1; 713/2
(58) Field of Classification Search ...................... 713/1
  See application file for complete search history.

(56) References Cited

U.S. PATENT DOCUMENTS

| | | | | |
|---|---|---|---|---|
| 5,473,775 A * | 12/1995 | Sakai et al. ............. | 713/2 |
| 5,793,943 A * | 8/1998 | Noll ........................ | 714/6 |
| 6,185,696 B1 * | 2/2001 | Noll ........................ | 714/6 |
| 6,272,628 B1 * | 8/2001 | Aguilar et al. .......... | 713/2 |
| 6,330,634 B1 * | 12/2001 | Fuse et al. .............. | 711/103 |
| 6,363,492 B1 * | 3/2002 | James et al. ............ | 714/1 |
| 6,453,414 B1 * | 9/2002 | Ryu ........................ | 713/2 |
| 6,498,750 B2 * | 12/2002 | Terada .................... | 365/185.11 |
| 6,611,907 B1 * | 8/2003 | Maeda et al. ........... | 711/170 |
| 6,829,675 B2 * | 12/2004 | Maeda et al. ........... | 711/103 |
| 2002/0188763 A1 * | 12/2002 | Griffin ..................... | 709/310 |

FOREIGN PATENT DOCUMENTS

JP    404088432 A    *    3/1992

* cited by examiner

*Primary Examiner*—Rehana Perveen
*Assistant Examiner*—Stefan Stoynoy
(74) *Attorney, Agent, or Firm*—Bacon & Thomas, PLLC

(57) ABSTRACT

A method for safeguarding a digital process device having a data storage slot comprises the steps of: providing a drawable storage device for storing a start-up code of the digital process device; and processing the starting code for executing a start-up operation of the digital process device when the drawable storage device is inserted into the data storage slot of the digital process device.

14 Claims, 3 Drawing Sheets

METHOD AND DEVICE FOR SAFEGUARDING A DIGITAL PROCESS DEVICE

FIELD OF THE INVENTION

The present invention is related to a method and a device for safeguarding a digital process device, and more particularly to safeguard the personal computer (PC) by way of the safeguard key in the memory card. Therefore when the PC is powered on, a digital certification and BIOS(Basic Input Output System) update may be executed in order to promote the PC safety.

BACKGROUND OF THE INVENTION

The utility of the computer is well-known. It can process many important programs, documents or data. Therefore, once the computer is broken, the damage will follow. Unfortunately, an unpredictable accident can always happen, and above all, the damage from a computer virus is the most serious and the most unpreventable. The methods that viruses invade the computer are various. The anti-virus software may defense many viruses, but the new viruses overcoming the anti-virus are produced quickly. Therefore, how to reduce the loss caused by a virus is an important topic.

A new virus is able to invade computer BIOS(Basic Input Output System). The BIOS virus damaging to the computer system and obstructing the computer operation will cause a large loss. Therefore, it is necessary to reduce the loss when this accident happens.

The original method to resolve this kind of accident is to replace the damaged BIOS ROM with a new BIOS ROM (Read Only Memory) or to write a new BIOS into the EPROM (Erasable Program ROM), but his method is not convenient. Another method is to design a backup BIOS on the motherboard. When the main BIOS is invaded by a virus, the system can switch to the backup BIOS to start the computer, but it is obvious that this method will increase the cost of a motherboard.

SUMMARY OF THE INVENTION

An object of the present invention is to provide a new method for improving the mentioned weak points by way of using a memory stick or a storage card.

Another object of the present invention is to provide a new method for starting the computer by way of a storage card after the computer is invaded by a virus.

Another object of the present invention is to provide a new method for updating the BIOS of the motherboard by way of writing the correct version of BIOS into the EPROM when the computer is invaded by a virus but started by the storage card.

According to the present invention, a method for safeguarding a digital process device having a data storage slot comprises the steps of: providing a drawable storage device for storing a start-up code of the digital process device; and processing the starting code for executing a start-up operation of the digital process device when the drawable storage device is inserted into the data storage slot of the digital process device.

In accordance with one aspect of the present invention, the digital process device is a computer, and the data storage slot is a slot of a memory card.

In accordance with one aspect of the present invention, the drawable storage device is a storage card.

In accordance with one aspect of the present invention, the start-up code includes a password of the digital process device, the digital process device use the password to execute the start-up operation in order to proceed a digital certification operation.

In accordance with one aspect of the present invention, the start-up code includes a correct version of BIOS for starting up the digital process device.

In accordance with one aspect of the present invention, the start-up code includes a new version BIOS for updating an old version BIOS of the digital process device.

In accordance with one aspect of the present invention, before processing the start-up code, detect a BIOS of the digital process device, and depending on a damage of the BIOS, using the drawable storage device to start up the digital process device.

In accordance with one aspect of the present invention, a recovery operation is executed after the start-up operation.

According to the present invention, a device for safeguarding a digital process device comprising: a storage device independent from the digital process device, the storage device having a start-up code of the digital process device; and an interface electrically connected to the digital process device and being able to receive the storage device, the digital process device executing a start-up operation through the interface.

In accordance with one aspect of the present invention, the storage device has a drawable storage device and a data storage slot, and the data storage slot is a slot of the drawable storage device.

In accordance with one aspect of the present invention, the drawable storage device is a storage card.

In accordance with one aspect of the present invention, the digital process device is a computer.

In accordance with one aspect of the present invention, the start-up code includes a password of the digital process device, the digital process device use the password to execute the start-up operation in order to proceed a digital certification operation.

In accordance with one aspect of the present invention, the start-up code includes a correct version of BIOS for starting up the digital process device.

In accordance with one aspect of the present invention, the start-up code includes a new version BIOS for updating an old version BIOS of the digital process device.

In accordance with one aspect of the present invention, when the digital process device processes the start-up code, a BIOS of the digital process device is detected previously, and depending on a damage of the BIOS, the drawable storage device is used to start up the digital process device.

In accordance with one aspect of the present invention, a recovery operation is executed after the start-up operation.

The present invention may best be understood through the following description with reference to the accompanying drawings, in which:

DETAILED DESCRIPTION OF THE PREFERRED EMBODIMENT

Figure 1:
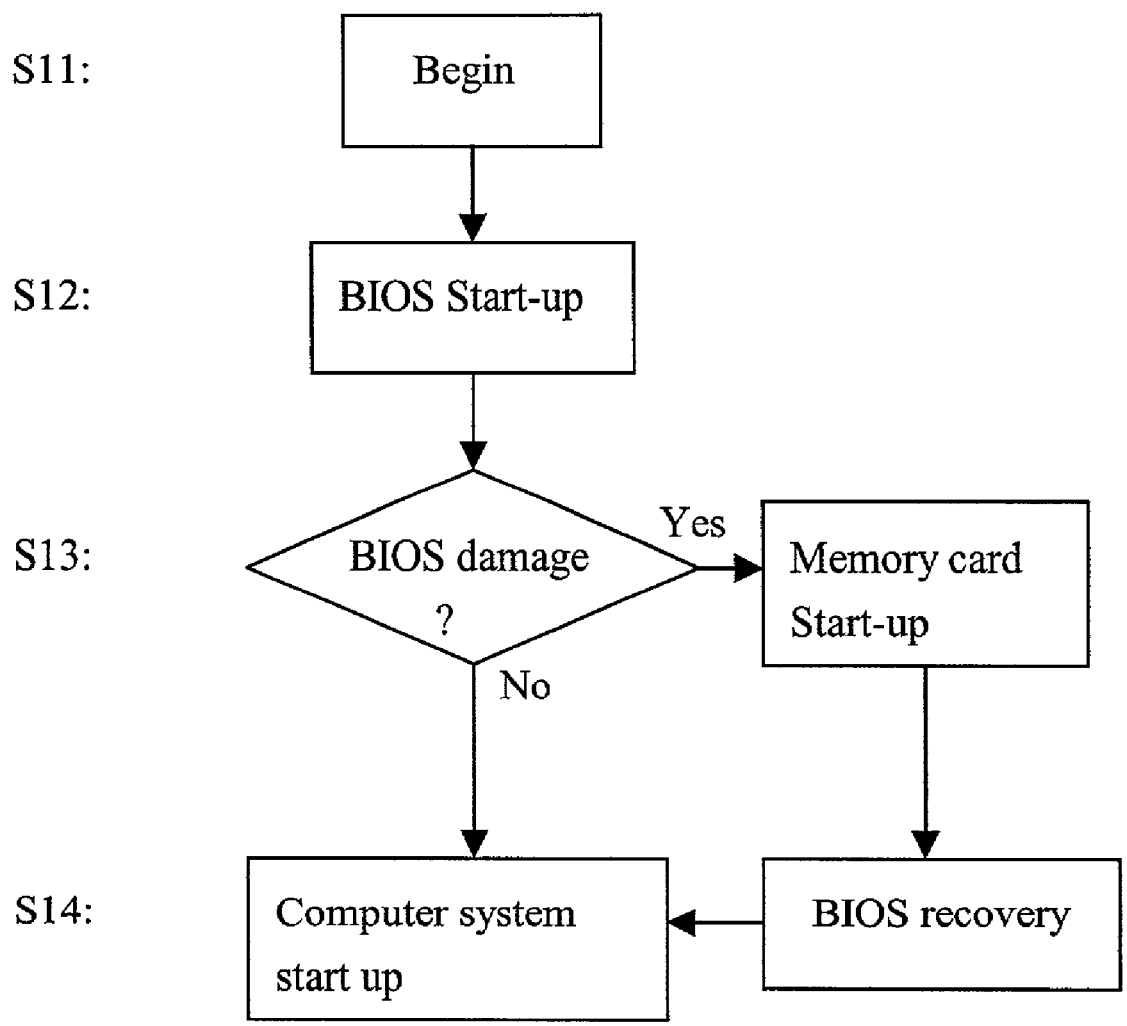
FIG. 1 is a flowchart for recovering the BIOS (Basic Input Output System) with the memory card according to the present invention.

Please refer to FIG. 1 showing flowchart for recovering the BIOS with the memory card( or storage card). The steps are as follows:

S11: Begin. The computer is powered on.

S12: After the computer is powered up, the program counter of the CPU (Central Process Unit) will point to the starting address of the BIOS. Then the the BIOS will be responsible for starting up the computer.

S13: Check the BIOS. If the BIOS are damaged, a hardware method can be used to make the program counter of the CPU pointing to the address of the memory card. The memory card is of one type of ROM (Read Only Memory). It stores the correct version BIOS. Therefore, when the program counter points to the exact address of the memory card, the BIOS stored in the memory card will be executed and the the computer will be started up.

S14: If the BIOS is not damaged, the computer will be started up normally. On the other hand, if the computer is started up with the memory card, the BIOS will be recovered after the computer are started. That is, the correct version BIOS stored in the memory card will be written to the flash ROM in the computer system, so next time the computer will be started up by itself.

Figure 2:
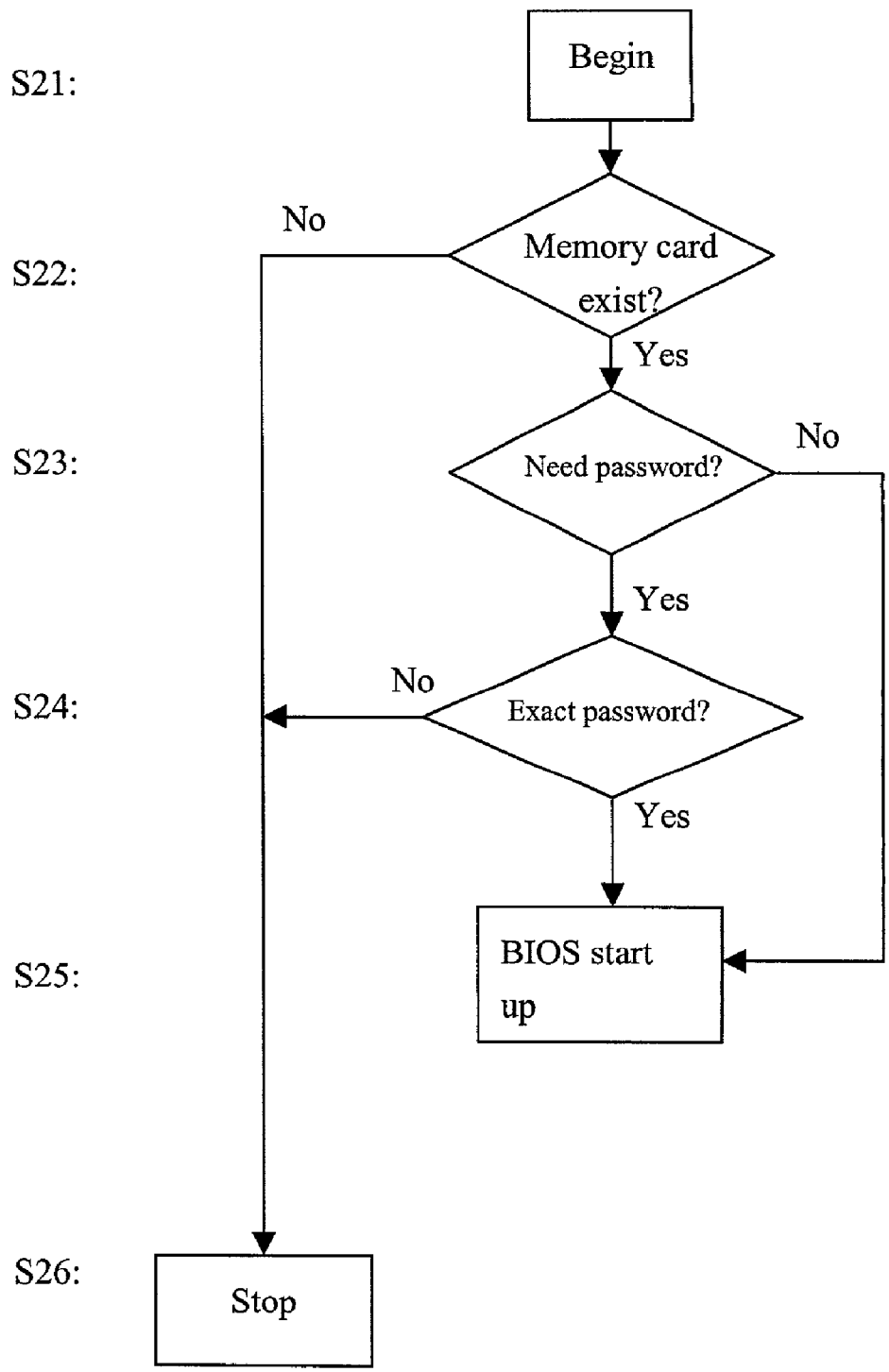
FIG. 2 is a flowchart for digital certification with the memory card according to the present invention.

FIG. 2 is a flowchart for digital certification with the memory card according to the present invention. The steps are as follows:

S21: Begin.

S22: Check whether the memory is inserted on the memory card slot.

S23: Generally, the personal data is stored in the memory card. The computer can certificate the user through the personal data. But, for the sake of security, a password may set into the memory card. Therefore, if the password is ignored, then jump to step S25.

S24: If the password is necessary, then check the password.

S25: If the password is correct, then start up the computer with the BIOS.

S26: If the password is wrong, then stop computer.

Figure 3:
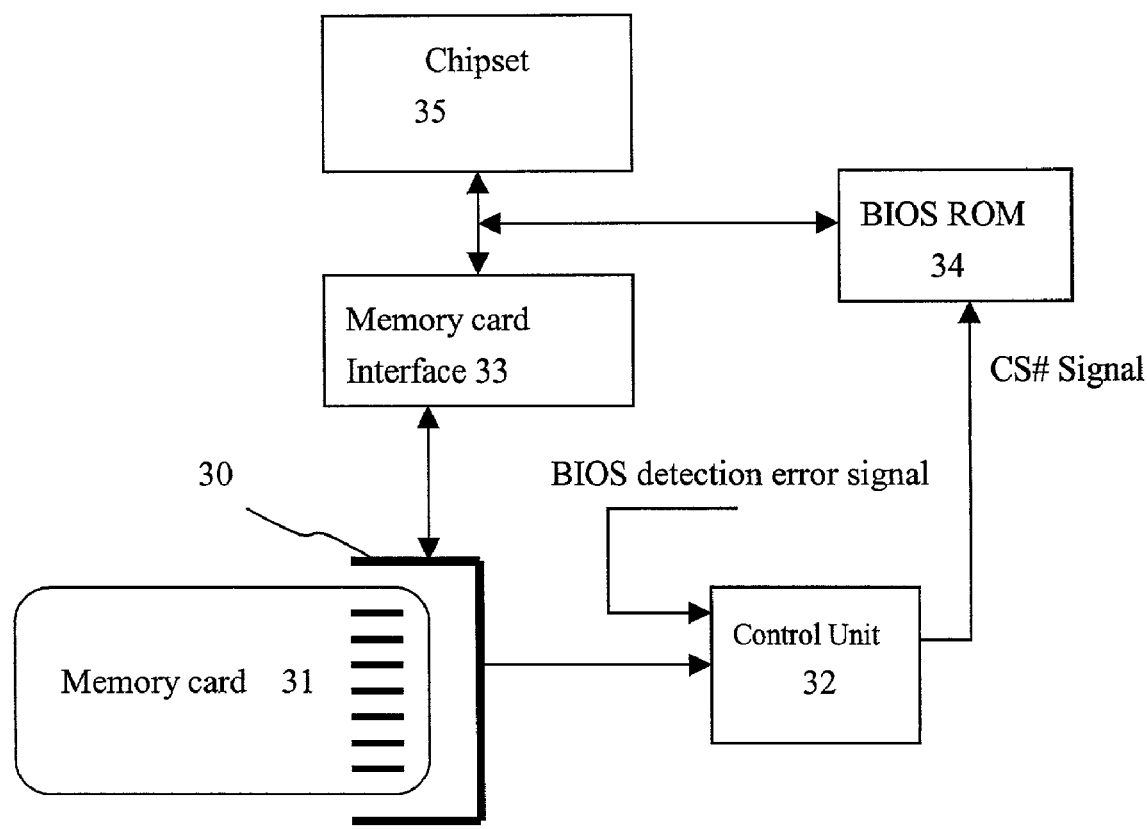
FIG. 3 is a block diagram according to the present invention.

FIG. 3 is the block diagram according to the present invention. The chipset 35, the BIOS ROM 34, the memory card interface 33, the control unit 32, the memory card 31 and the memory card slot 30 are included. This hardware stucture is based on a computer. Therefore, the BIOS update, the BIOS recovery, the digital certification or the memory card start-up may be worked.

The memory card 31 is a drawable memory card. It can be drawn from the memory card slot 30 or insert into the memory card slot 30. The start-up code is stored in the memory card. The start-up code includes the password data and correct version BIOS (or new version BIOS). When the memory card 31 are inserted into the memory card slot 30, the system may process the start-up code for executing the start-up operation of the computer.

Due to the start-up code stored n the drawable memory card, the system on the start-up operation can address the memory card and access the start-up code. As shown in FIG. 3, when the BIOS on the mother board is damaged, the BIOS wrong or "error detection" signal and memory card 31 inserting signal will enable the control unit 32 to drop down the CS# signal. If the CS# signal is dropped down, the BIOS ROM 34 will be inactive, so the BIOS in the memory card will execute the start-up operation of the computer. Certainly, the control unit 32 can be implemented by an AND gate.

For the application, the memory card may be a storage card, the memory card slot may be a storage card slot, and the the computer may be a digital process device.

The memory card having a password may execute the digital certification when the computer is powered on. The correct version BIOS stored in the memory card may be used to start up the digital process device. Certainly, the new version BIOS stored in the memory card may be used to update the old BIOS in the mother board. The system BIOS may be checked before the start-up operation. If the system BIOS is damaged, the BIOS in the drawable memory device may be used to start up the computer. The correct version BIOS in the memory card may be written into the BIOS ROM, after the computer is started up, if the system BIOS is damaged. The correct version BIOS or the new version BIOS is included in the start-up code.

Speaking of the technique detail, the storage card such as memory stick and memory card is used to start up the computer by detecting the BIOS damage or the check sum error at the start-up precedure. If the BIOS is damaged, a writing process to the flash memory can be proceeded, after the program in the storage card is read to the system RAM. If the ROM chip is broken completely, the storage card may replace it to start up the computer system. On the other hand, the storage card to start up the computer may be attain the object of protable BIOS and computer security&privacy.

The advantages of the present invention are as follows:

1. The digital certification is implemented.

2. The BIOS recovery or update with the start-up code in the memory card may safeguard the computer against the virus accidents.

3. The memory card can be used to start up the computer, so the BIOS is protable, and the security or privacy of the computer will be improved.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for safeguarding a digital process device, said method comprising steps of:
    inserting a memory card device into a data storage slot of said digital process device, wherein said data storage slot has an address, said memory card stores a start-up code of said digital process device, and said start up code includes a correct version of BIOS;
    responsive to said memory card device being inserted, generating a memory card inserted signal;
    proceeding to a start-up operation of said digital process device, said start-up operation including a BIOS check for detecting whether the BIOS is defective;
    responsive to the BIOS being not defective, executing a remaining portion of said start-up operation; and
    responsive to the BIOS being defective, generating a BIOS detection error signal, automatically pointing to the address of said data storage slot, and thus executing said start-up code in said memory card device according to said memory card inserted signal and said BIOS detection error signal.

2. The method according to claim 1, wherein said digital process device is a computer, and said data storage slot is a slot of a memory card.

3. The method according to claim 1, wherein said start-up code includes a password of said digital process device, said digital process device using said password to execute said start-up operation in order to proceed a digital certification operation.

4. The method according to claim 1, wherein the BIOS is recovered after said start-up code in said memory card device is executed.

5. The method according to claim 1, wherein said BIOS detection error signal is used to indicate an abnormal BIOS condition of said digital process device.

6. The method according to claim 5, wherein said abnormal BIOS condition consists of damage of the BIOS, data loss of the BIOS, and virus invasion of the BIOS.

7. The method according to claim 1, wherein said memory card inserted signal and BIOS detection error signal are employed by a control unit of said digital process device for disabling said BIOS.

8. The method according to claim 7, wherein said control unit comprises an AND gate.

9. A device for safeguarding a digital process device comprising:
   a central processing unit;
   an onboard BIOS ROM for executing a normal start-up operation;
   a storage device independent from said digital process device, said storage device having a start-up code of said digital process device, wherein said start-up code includes a correct version of BIOS for starting up said digital process device and recovering said onboard BIOS ROM when said onboard BIOS ROM is defective;
   an interface electrically connected to said digital process device and said storage device, said digital process device executing a start-up operation via said start-up code stored on said storage device through said interface; and
   a control unit for causing said onboard BIOS ROM to be inactive when said storage device has been inserted into said interface and a defect of onboard BIOS ROM is found during a BIOS check of said normal start-up procedure;
   whereby said central processing unit will automatically point to said storage device, and thus said start-up code will be executed after said onboard BIOS ROM is disabled.

10. The device according to claim 9, wherein said control unit comprises an AND gate.

11. The device according to claim 10, wherein said control unit drop down CS# signal to cause said onboard BIOS ROM to be inactive, when said storage device has been inserted into said interface, and the defect of on board BIOS ROM is found during the BIOS check of said normal start-up procedure.

12. The device according to claim 9, wherein said digital process device is a computer.

13. The device according to claim 9, wherein said start-up code includes a password of said digital process device, said digital process device use said password to execute said start-up operation in order to proceed a digital certification operation.

14. The device according to claim 9, wherein said onboard BIOS ROM is recovered after said start-up code in said storage device is executed.

* * * * *